United States Patent
Kung

(10) Patent No.: US 7,418,926 B2
(45) Date of Patent: Sep. 2, 2008

(54) PET STRAP HAVING BUFFERING EFFECT

(76) Inventor: Kun-Tan Kung, 10, Lane 2, Sec. 2, Jwu Shy Rd., Long Ching Hsiang (TW)

( * ) Notice: Subject to any disclaimer, the term of this patent is extended or adjusted under 35 U.S.C. 154(b) by 263 days.

(21) Appl. No.: 11/288,932

(22) Filed: Nov. 29, 2005

(65) Prior Publication Data

US 2007/0119386 A1    May 31, 2007

(51) Int. Cl.
*A01K 27/00* (2006.01)
(52) U.S. Cl. .............. 119/798; 119/797; 119/795; 119/769
(58) Field of Classification Search .............. 119/798, 119/797, 795, 769, 770, 792, 799; 24/300
See application file for complete search history.

(56) References Cited

U.S. PATENT DOCUMENTS

| | | | | |
|---|---|---|---|---|
| 2,499,511 A | * | 3/1950 | Koger | 119/803 |
| 2,704,052 A | * | 3/1955 | Wood | 119/804 |
| 4,599,074 A | * | 7/1986 | Beckly | 441/80 |
| 6,098,572 A | * | 8/2000 | Cook | 119/802 |
| 6,202,263 B1 | * | 3/2001 | Harker | 24/300 |
| 6,467,437 B2 | * | 10/2002 | Donovan et al. | 119/798 |
| 7,093,329 B1 | * | 8/2006 | Chiu | 24/301 |
| 2004/0216695 A1 | * | 11/2004 | Stovall | 119/769 |
| 2007/0261213 A1 | * | 11/2007 | Nolan et al. | 24/300 |

* cited by examiner

*Primary Examiner*—Peter M. Poon
*Assistant Examiner*—Willie Berry, Jr.
(74) *Attorney, Agent, or Firm*—Alan Kamrath; Kamrath & Associates PA

(57) ABSTRACT

A pet strap includes a pulling unit, a locking unit, and an elastic drawing mounted between the pulling unit and the locking unit and including an elastic inner tube and a weaving outer layer mounted on a surface of the inner tube. Thus, the elastic drawing unit provides a buffering effect to the user to reduce the reaction applied by the pet on the user's hand, thereby preventing the user's wrist from being hurt when the pet is running violently. In addition, the weaving outer layer is enclosed around the inner tube, so that when the inner tube is broken due to an excessive reaction, the inner tube will not being sprung outward, thereby preventing the user from being hurt by the broken inner tube.

12 Claims, 5 Drawing Sheets

PRIRO ART

US 7,418,926 B2

PET STRAP HAVING BUFFERING EFFECT

BACKGROUND OF THE INVENTION

1. Field of the Invention

The present invention relates to a pet strap and, more particularly, to a pet strap having a buffering effect.

2. Description of the Related Art

A conventional pet strap in accordance with the prior art shown in FIG. 6 comprises a pulling unit 1 having a first portion provided with a retaining portion 11 for retaining a snapping member 13 and a second portion provided with a loop 12 to facilitate a user holding the pulling unit 1, and a turnbuckle 14 pivotally mounted on the snapping member 13 of the pulling unit 1 and snapped onto a neck collar (not shown) of a pet, such as a dog or the like. However, the pulling unit 1 cannot provide a buffering effect to the user to reduce the reaction applied by the pet on the user's hand, so that the user's wrist is easily hurt when the pet is running violently. In addition, the pulling unit 1 will be rotated by the pet when the pet is rolling or running irregularly, so that the pulling unit 1 is easily tangled, and the user's wrist is easily hurt when the pet is rolling or running violently.

SUMMARY OF THE INVENTION

In accordance with the present invention, there is provided a pet strap, comprising a pulling unit, a locking unit, and an elastic drawing mounted between the pulling unit and the locking unit and including an elastic inner tube and a weaving outer layer mounted on a surface of the inner tube.

The primary objective of the present invention is to provide a pet strap having a buffering effect to a user so that the user feels comfortable when holding the pet strap and will not be hurt when an excessive force is applied on the pet strap.

Another objective of the present invention is to provide a pet strap, wherein the elastic drawing unit between the pulling unit and the locking unit provides a buffering effect to the user by the elastic action of the inner tube to reduce the reaction applied by the pet on the user's hand, thereby preventing the user's wrist from being hurt when the pet is running violently.

A further objective of the present invention is to provide a pet strap, wherein the weaving outer layer of the elastic drawing unit is enclosed around the whole length of the surface of the inner tube, so that when the inner tube is broken due to an excessive reaction, the inner tube will not being sprung outward, thereby preventing the user from being hurt by the broken inner tube.

A further objective of the present invention is to provide a pet strap, wherein the snapping member of the pulling unit is pivotally mounted on the neck portion of one of the two fixing members, so that the pulling unit will not be rotated in concert with the elastic drawing unit when the elastic drawing unit is rotated by the pet, thereby preventing the pulling unit from being tangled, and thereby preventing the user's wrist from being hurt when the pet is rolling violently.

Further benefits and advantages of the present invention will become apparent after a careful reading of the detailed description with appropriate reference to the accompanying drawings.

DETAILED DESCRIPTION OF THE INVENTION

Figure 1:
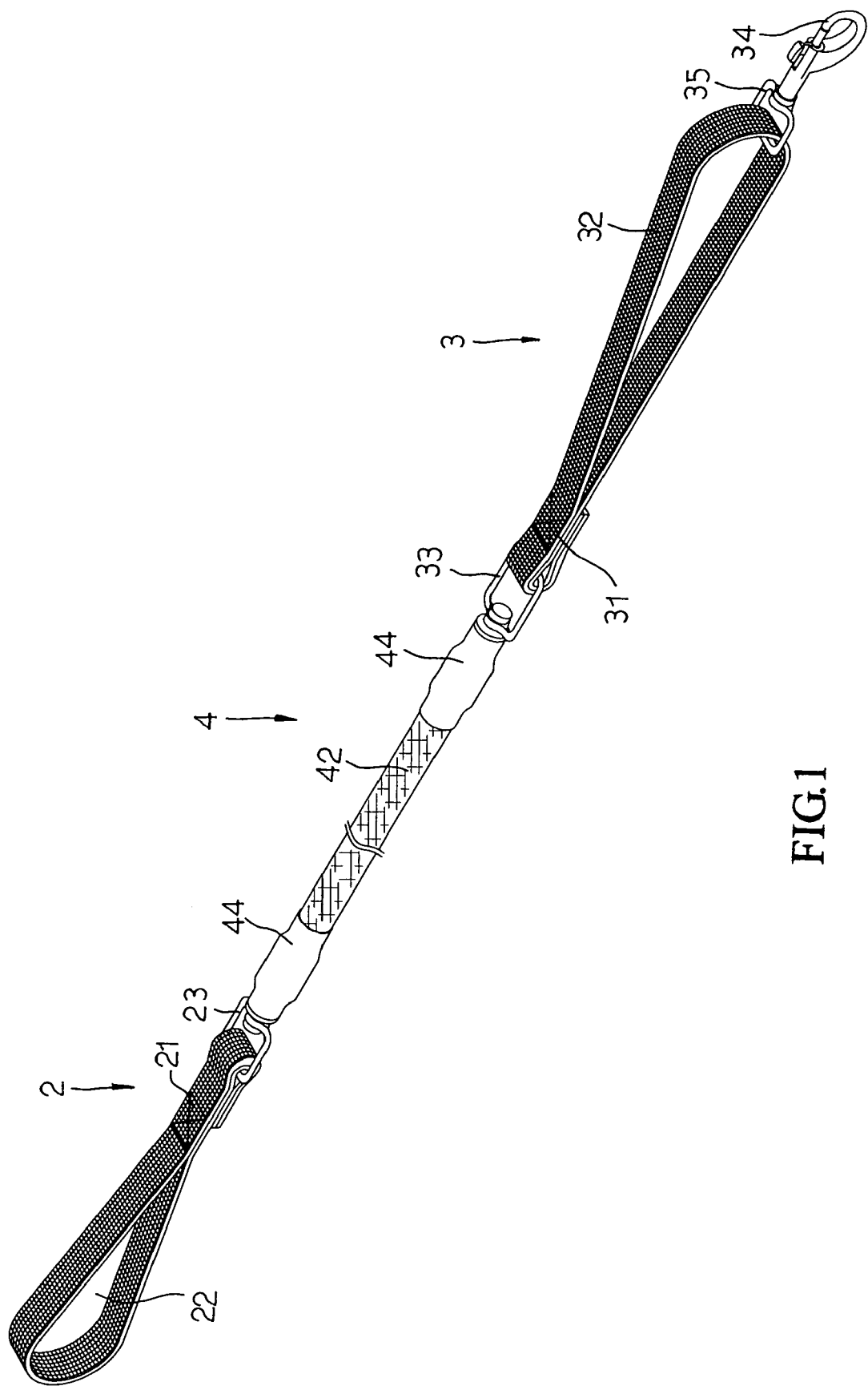
FIG. 1 is a perspective view of a pet strap in accordance with the preferred embodiment of the present invention.
Figure 2:
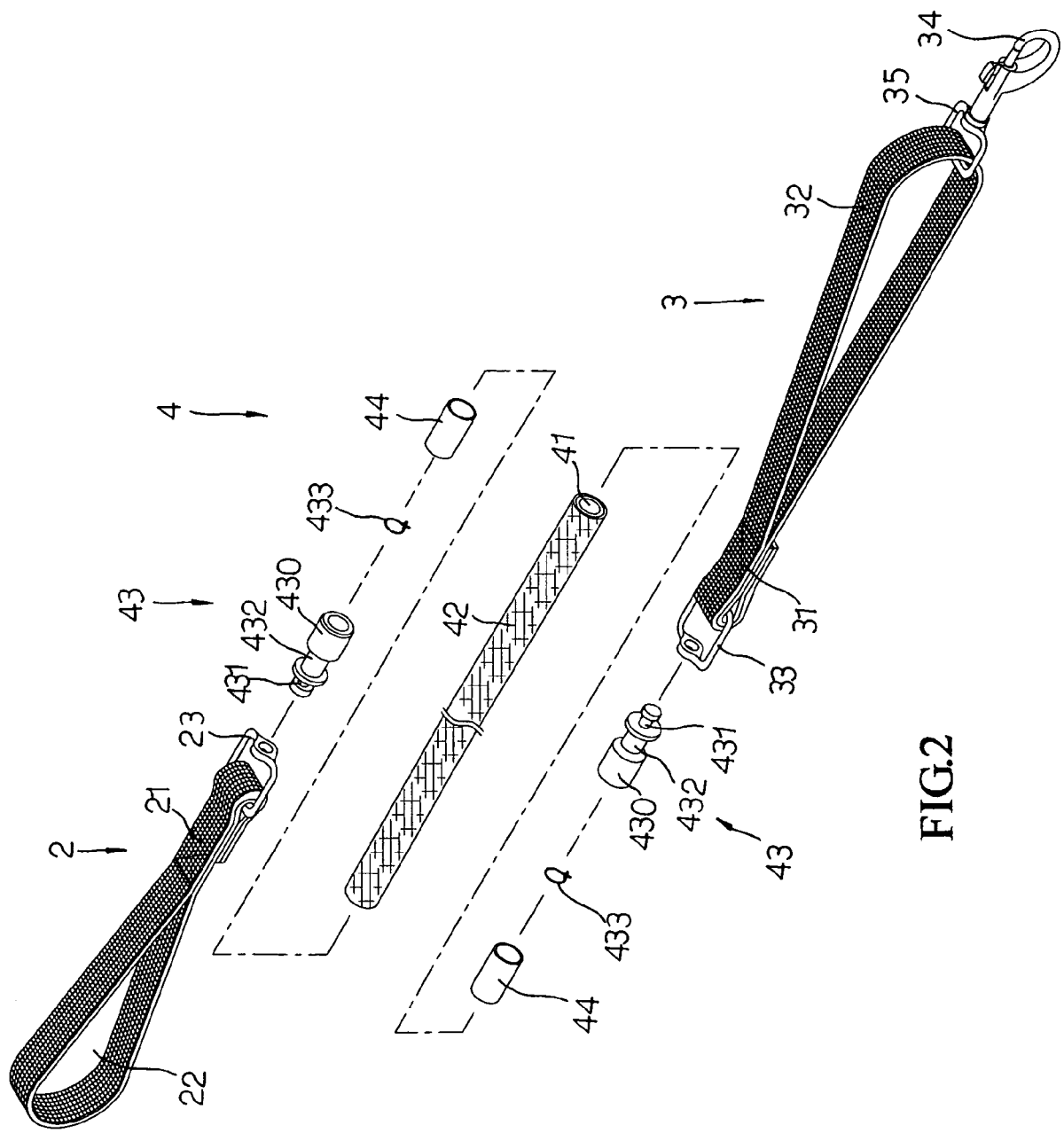
FIG. 2 is an exploded perspective view of the pet strap as shown in FIG. 1.
Figure 3:
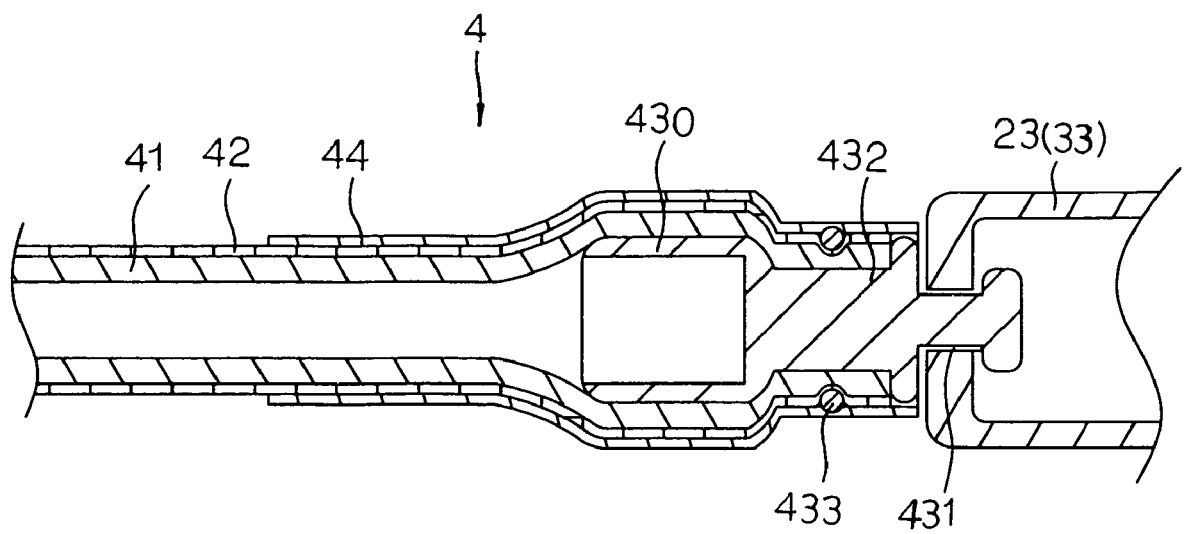
FIG. 3 is a plan cross-sectional view of the pet strap as shown in FIG. 1.
Figure 4:
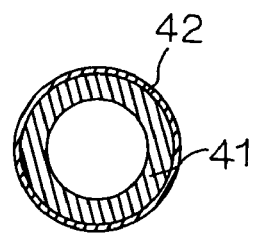
FIG. 4 is a plan cross-sectional view of an elastic drawing unit of the pet strap as shown in FIG. 2.

Referring to the drawings and initially to FIGS. 1-4, a pet strap in accordance with the preferred embodiment of the present invention comprises a pulling unit 2, a locking unit 3, and an elastic drawing unit 4 mounted between the pulling unit 2 and the locking unit 3 and including an elastic inner tube 41 and a weaving outer layer 42 mounted on a surface of the inner tube 41. The weaving outer layer 42 of the elastic drawing unit 4 is enclosed around a whole length of the surface of the inner tube 41.

The pulling unit 2 has a first portion provided with a retaining portion 21 for retaining a snapping member 23 and a second portion provided with a loop 22 to facilitate a user holding the pulling unit 2.

The locking unit 3 has a first portion provided with a retaining portion 31 for retaining a first snapping member 33 and a second portion provided with a loop 32 for mounting a second snapping member 35. A turnbuckle 34 is pivotally mounted on the second snapping member 35 of the locking unit 3 and snapped onto a neck collar (not shown) of a pet, such as a dog or the like.

The elastic drawing unit 4 further includes two fixing members 43 each having a first end provided with an enlarged plug 430 inserted into a respective end portion of the inner tube 41 and a second end provided with a neck portion 431 pivotally mounted on the snapping member 23 of the pulling unit 2 or the first snapping member 33 of the locking unit 3, two clips 433 each clamped on a respective end portion of the outer layer 42 to clamp the respective end portion of the inner tube 41 on the respective fixing member 43, and two contraction tubes 44 each bonded on the respective end portion of the outer layer 42 to clamp the respective fixing member 43 in the inner tube 41.

Each of the two fixing members 43 of the elastic drawing unit 4 has a mediate portion formed with an annular retaining groove 432 aligning with the respective clip 433 to retain the respective end portion of the inner tube 41 by the respective clip 433. The enlarged plug 430 of each of the two fixing members 43 has a diameter greater than an inner diameter of the inner tube 41 so that the inner tube 41 is expanded radially outward by its elasticity to press the enlarged plug 430 of each of the two fixing members 43.

Each of the two contraction tubes 44 of the elastic drawing unit 4 is enclosed around the respective clip 433. Each of the two contraction tubes 44 of the elastic drawing unit 4 contains adhesive therein.

In assembly, each of the two contraction tubes 44 of the elastic drawing unit 4 is contractible radially inward when being heated to compress the respective end portion of the outer layer 42 to clamp the respective fixing member 43 in the inner tube 41, while the adhesive contained in each of the two contraction tubes 44 is fused when being heated, so that the fused adhesive contained in each of the two contraction tubes 44 is infiltrated into the respective end portion of the outer layer 42 to combine each of the two contraction tubes 44 with the respective end portion of the outer layer 42 closely.

Accordingly, the elastic drawing unit 4 between the pulling unit 2 and the locking unit 3 provides a buffering effect to the user by the elastic action of the inner tube 41 to reduce the reaction applied by the pet on the user's hand, thereby preventing the user's wrist from being hurt when the pet is running violently.

In addition, the weaving outer layer 42 of the elastic drawing unit 4 is enclosed around the whole length of the surface of the inner tube 41, so that when the inner tube 41 is broken due to an excessive reaction, the inner tube 41 will not being sprung outward, thereby preventing the user from being hurt by the broken inner tube 41.

Further, the snapping member 23 of the pulling unit 2 is pivotally mounted on the neck portion 431 of one of the two fixing members 43 of the elastic drawing unit 4, so that the pulling unit 2 will not be rotated in concert with the elastic drawing unit 4 when the elastic drawing unit 4 is rotated by the pet, thereby preventing the pulling unit 2 from being tangled, and thereby preventing the user's wrist from being hurt when the pet is rolling violently.

Figure 5:
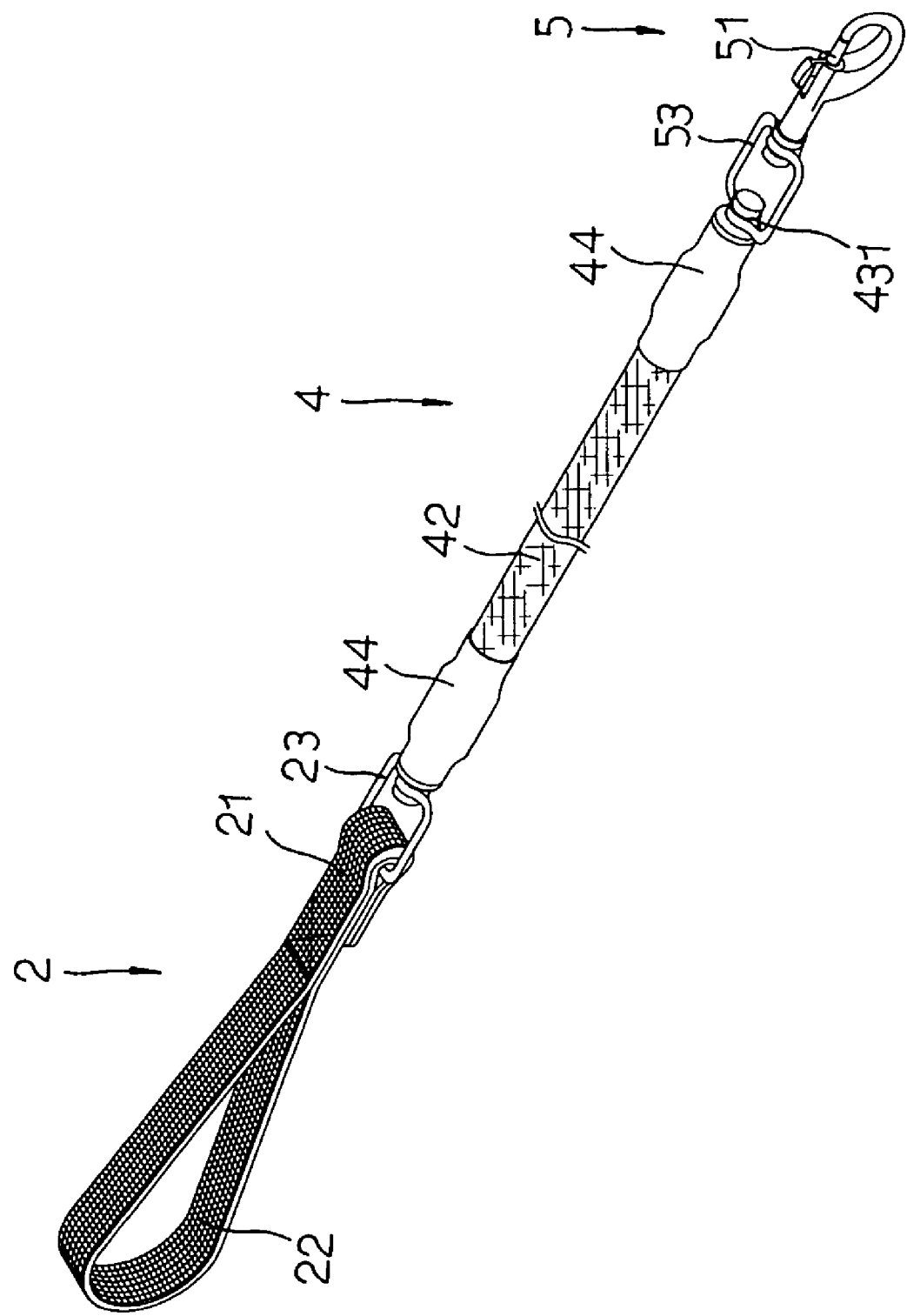
FIG. 5 is a perspective view of a pet strap in accordance with another preferred embodiment of the present invention.
Figure 6:
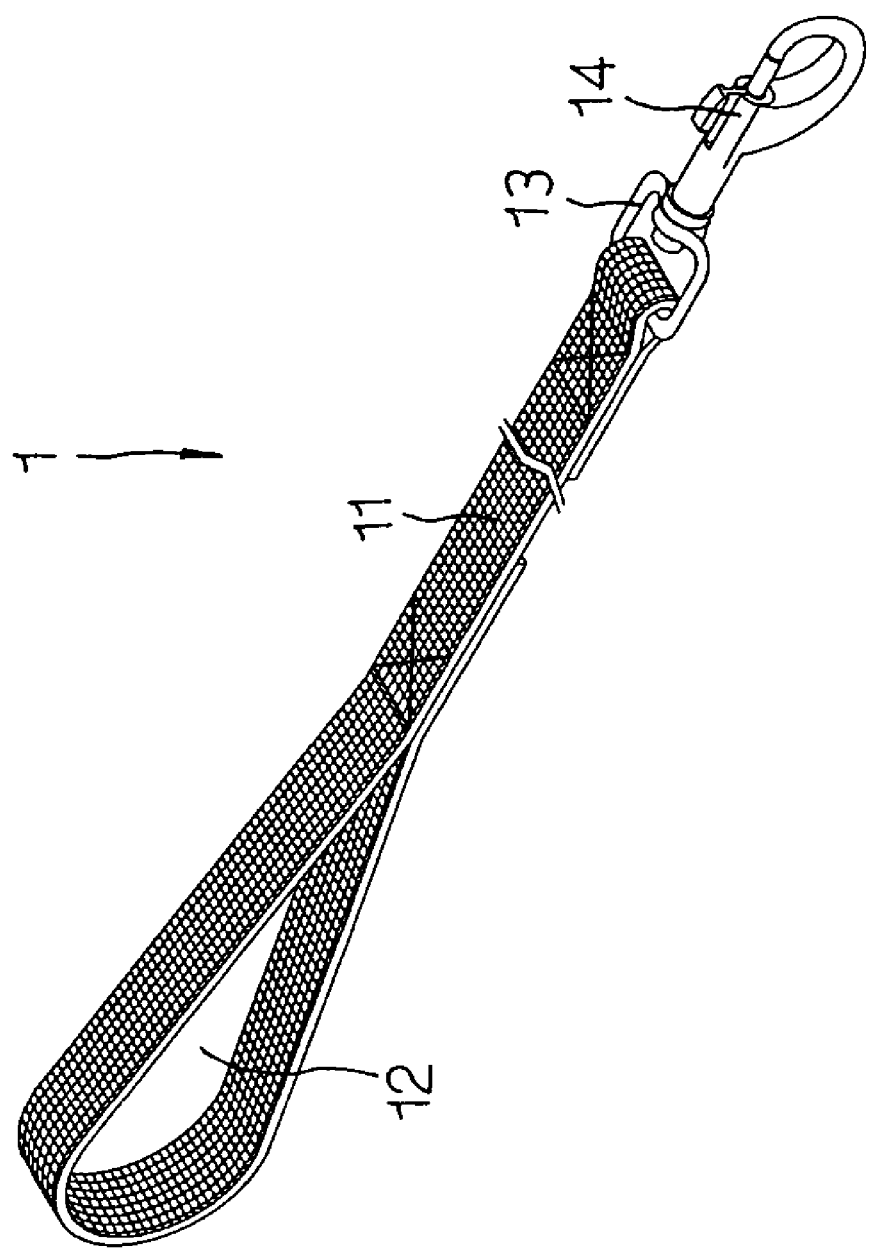
FIG. 6 is a perspective view of a conventional pet strap in accordance with the prior art.

Referring to FIG. 5, the elastic drawing unit 4 is mounted between the pulling unit 2 and a locking unit 5. The locking unit 5 includes a snapping member 53 pivotally mounted on the neck portion 431 of one of the two fixing members 43 of the elastic drawing unit 4, and a turnbuckle 51 pivotally mounted on the snapping member 53 and snapped onto a neck collar (not shown) of a pet, such as a dog or the like.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pet strap, comprising:
   a pulling unit in a form of a loop;
   a locking unit in a form of a loop;
   an elastic drawing unit mounted between the pulling unit and the locking unit and including an elastic inner tube and a weaving outer layer mounted on a surface of the inner tube;
   wherein the elastic drawing unit further includes two fixing members each having a first end provided with an enlarged plug inserted into a respective end portion of the inner tube and a second end connected to a snapping member having a central aperture, the snapping members secured to proximal ends of said pulling and locking units;
   the enlarged plug of each of the two fixing members has a diameter greater than an inner diameter of the inner tube so that the inner tube is expanded radially outward by its elasticity to press the enlarged plug of each of the two fixing members, the distal end of said locking unit loop having a turnbuckle attached thereto.

2. The pet strap in accordance with claim 1, wherein the weaving outer layer of the elastic drawing unit is enclosed around a whole length of the surface of the inner tube.

3. The pet strap in accordance with claim 1, wherein the elastic drawing unit further includes two contraction tubes each bonded on the respective end portion of the outer layer to clamp the respective fixing member in the inner tube.

4. The pet strap in accordance with claim 3, wherein each of the two contraction tubes of the elastic drawing unit is enclosed around a respective clip.

5. The pet strap in accordance with claim 3, wherein each of the two contraction tubes of the elastic drawing unit contains adhesive therein.

6. The pet strap in accordance with claim 5, wherein the adhesive contained in each of the two contraction tubes is fused when being heated, so that the fused adhesive contained in each of the two contraction tubes is infiltrated into the respective end portion of the outer layer to combine each of the two contraction tubes with the respective end portion of the outer layer closely.

7. The pet strap in accordance with claim 3, wherein each of the two contraction tubes of the elastic drawing unit is contractible radially inward when being heated to compress the respective end portion of the outer layer to clamp the respective fixing member in the inner tube.

8. The pet strap in accordance with claim 1, wherein each of the two fixing members of the elastic drawing unit has a mediate portion formed with an annular retaining groove aligning with the respective clip to retain the respective end portion of the inner tube by the respective clip.

9. The pet strap in accordance with claim 1, wherein the pulling unit has a first portion provided with a retaining portion for retaining said snapping member.

10. The pet strap in accordance with claim 9, wherein the locking unit has a first portion provided with a retaining portion for retaining one of the snapping members and a second portion provided with a loop for mounting another snapping member, to which said turnbuckle is pivotally mounted.

11. The pet strap in accordance with claim 10, wherein each of the two fixing members of the elastic drawing unit has the second end provided with a neck portion pivotally mounted on the snapping member of the pulling unit or the one of the snapping members of the locking unit.

12. The pet strap in accordance with claim 9, wherein each of the two fixing members of the elastic drawing unit has the second end provided with a neck portion pivotally mounted on the snapping member of the pulling unit or the one of the snapping members of the locking unit.

* * * * *